United States Patent [19]

Iida

[11] 4,132,124
[45] Jan. 2, 1979

[54] SHIFT MECHANISM FOR AUTOMOTIVE TRANSMISSION

[75] Inventor: Hiroshi Iida, Kariya, Japan

[73] Assignee: Manno Kogyo Company, Limited, Anjo, Japan

[21] Appl. No.: 835,080

[22] Filed: Sep. 20, 1977

[30] Foreign Application Priority Data

Sep. 29, 1976 [JP] Japan .......................... 51-130882[U]
Mar. 22, 1977 [JP] Japan .......................... 52-34466[U]

[51] Int. Cl.² ............................................. G05G 7/00
[52] U.S. Cl. .................................... 74/473 R; 74/491
[58] Field of Search ...................... 74/473 R, 491, 523

[56] References Cited

U.S. PATENT DOCUMENTS 4,050,325  9/1977  Shishido ............................ 74/473 R

FOREIGN PATENT DOCUMENTS 2658274 12/1976 Fed. Rep. of Germany ........ 74/473 R
1402662  8/1975 United Kingdom ................... 74/473 R

*Primary Examiner*—Allan D. Herrmann
*Attorney, Agent, or Firm*—Karl W. Flocks

[57] ABSTRACT

In a shift mechanism for an automotive transmission of the type wherein the lower end of a shift lever is coupled through a control rod to a control shaft of the automotive transmission, means for pivotally supporting the shift lever for the select and shift operations is mounted on a parallelogram double rocker linkage consisting of a pair of parallel rockers the upper ends of which are pivoted to a chassis and a coupler the both ends of which are pivoted to said pair of parallel rockers in such a way that the line connecting between the pivotal points of the coupler may be in parallel with the line connecting the upper pivotal points of the pair of parallel rockers and that the parallelogram double rocker linkage pivots about said upper pivotal points of the pair of parallel rockers in a vertical plane in parallel with the axis of the control rod; and the lower end of one of the pair of parallel rockers is pivoted to one end of a support rod which extends in parallel with the control rod and which has its the other end pivoted to the automotive transmission housing, whereby even when the displacement of the automotive transmission with respect to the chassis occurs, the knob at the top of the shift lever may be maintained substantially stationary.

5 Claims, 7 Drawing Figures

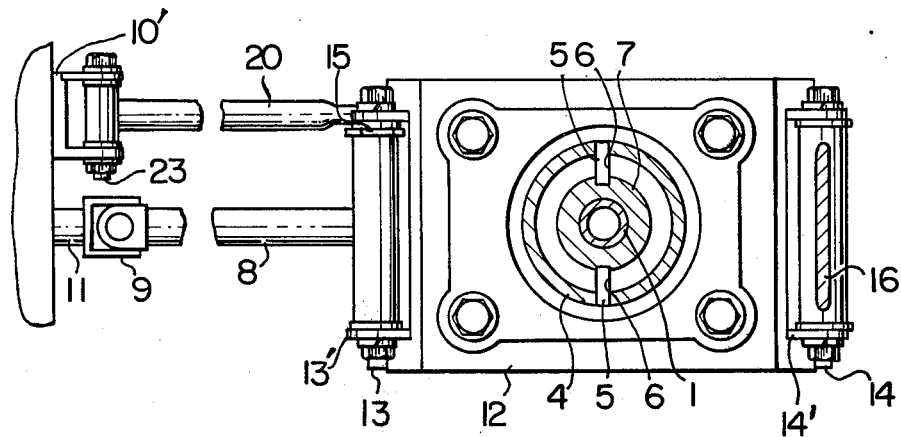
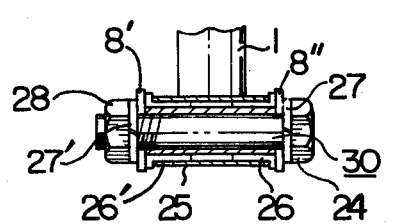
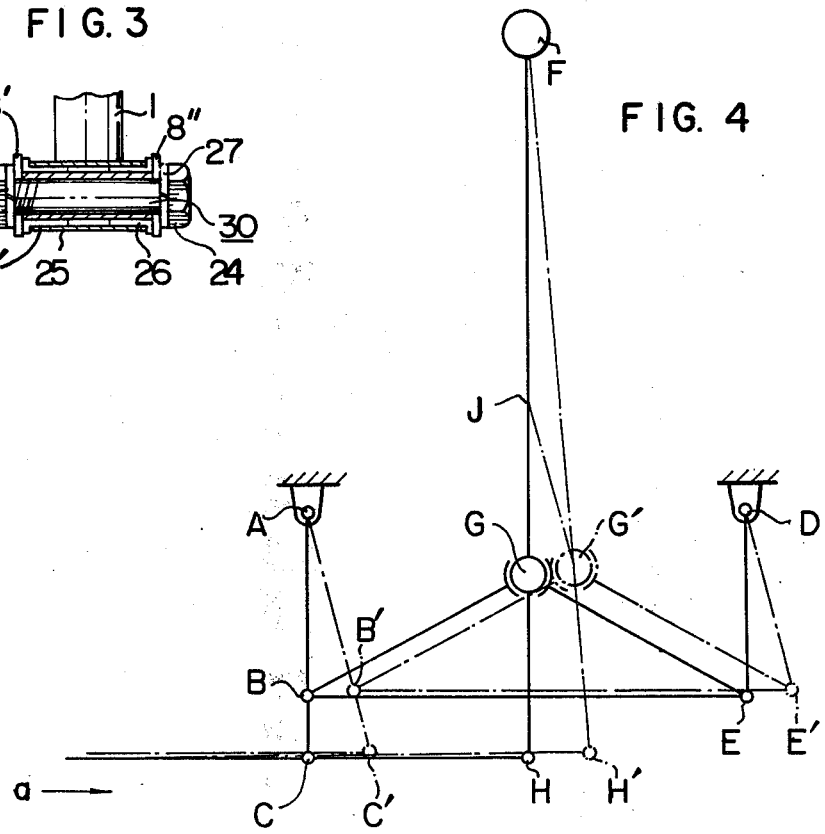

SHIFT MECHANISM FOR AUTOMOTIVE TRANSMISSION

The present invention relates to a shift mechanism for an automotive transmission.

An automotive engine is elastically mounted on a chassis so that the acceleration and deceleration of an automotive vehicle and the vibration of the engine itself cause up and down and back and forth displacement of the engine relative to the chassis. The displacement or vibration of the engine is transmitted through a transmission to a gear shift lever so that the slipping out or disengagement of transmission gears due to the inertia of the knob of the shift lever and the propagation of vibratory noise may result and consequently a driver has an unpleasant and uneasy feeling, adversely affecting his maneuvability.

One of the objects of the present invention is therefore to provide a shift mechanism for an automotive transmission which may substantially overcome the adverse effects of vibration of the engine on the shift lever knob and hence the driver.

Another object of the present invention is to provide a gear shift mechanism for an automotive transmission which is very simple in construction yet is very effective in maintaining the shift lever knob substantially in a stationary position even when the displacement or vibration of the engine occurs.

To the above and other ends, briefly stated the present invention provides a shift mechanism for an automotive transmission comprising a shift lever having a knob fixed at the upper end thereof; a parallelogram double rocker linkage comprising a pair of parallel rockers each having its upper end pivoted to a chassis, and a coupler having its both ends pivoted to said pair or rockers in such a way that the line connecting the pivoted points of said coupler may be in parallel with the line connecting between the upper pivotal points of said pair of rockers; means mounted on said parallelogram double rocker linkage for pivotably supporting said shift lever; a control rod having its one end pivoted to the lower end of said shift lever and its other end pivoted to a control shaft extended from said automotive transmission for transmitting the movement of said shift lever to said control shaft; and a support rod which is extended substantially in parallel with said control rod and which has its one end pivoted to the lower end below said pivotal point to said coupler of one of said parallel rockers and its other end pivoted to the housing of said automotive transmission.

According to one preferred embodiment of the present invention, said means for pivotally supporting the shift lever comprises a ball fulcrum, that is, a ball or spherical portion securely provided on the shift lever and a socket formed with a spherical surface adapted to snugly receive therein the ball or spherical portion of the shift lever. Alternatively, according to another preferred embodiment of the present invention, the lower end of an arm is pivoted to the coupler with a pivot pin the axis of which is alined with the axis of the control rod, and the shift lever is pivoted to the upper end of the arm with a pivot pin the axis of which is at right angle to the axis of the control rod.

According to one aspect of the present invention, the ratio of the distance from the upper pivotal point of one of the parallel rockers to the pivotal point to the coupler to the distance from said upper pivotal point to the lower pivotal point to the support rod is equal to the ratio of the distance from the center of the knob at the top end of the shift lever to the center of the ball fulcrum or the pivotal point to the upper end of the arm to the distance from the center of the knob to the lower pivotal point to the control rod.

The above and other objects, features and advantages of the present invention will become more apparent from the following description of preferred embodiments thereof taken in conjunction with the accompanying drawings.

FIG. 2 is a top view thereof;

FIG. 3 is a sectional view taken along the line III—III of FIG. 1 showing the construction of a pin joint;

FIG. 4 is a diagram used for the explanation of the underlying principle of the present invention;

Same reference numerals are used to designate similar parts throughout the figures.

FIRST EMBODIMENT, FIGS. 1-4

Figure 1:
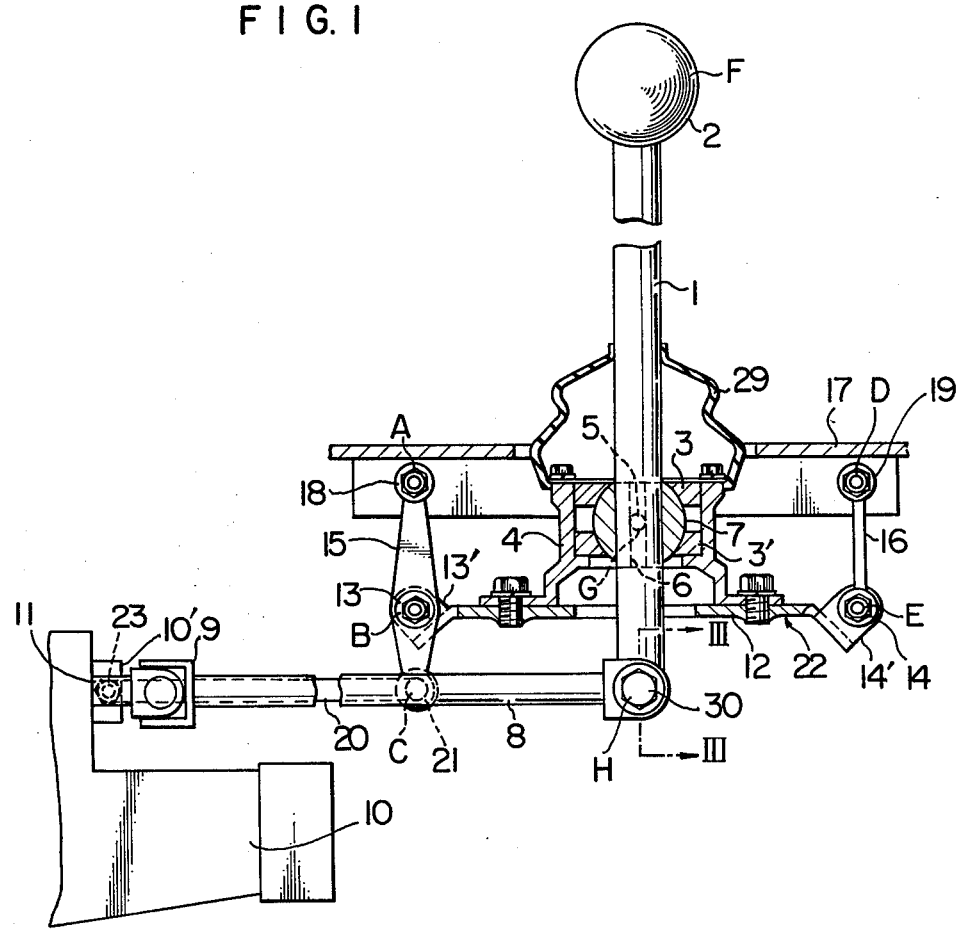
FIG. 1 is a front view, partly in section, of a first embodiment of a shift mechanism in accordance with the present invention.

Referring first FIGS. 1 and 2, a shift lever 1 with a knob 2 pivots about a ball fulcrum 7 rotatably supported with resilient members 3 and 3' in a shift lever housing 4 provided with a dust cover 29. The ball fulcrum 7 is formed with grooves 6 into which are fitted pins 5 extended from the shift lever housing 4 (See FIG. 2).

One end of a control shaft 11 extended out of an automotive transmission 10 is joined through a universal joint 9 to one end of a control rod 8, and the other end of the control rod 8 is pivoted with a pin 30 to the lower end of the shift lever 1 in a manner to be described in detail with particular reference to FIG. 3.

The shift lever housing 4 is mounted on and securely held with bolts and nuts to a coupler 12, and brackets 13' and 14' are securely fixed to the left and right sides of the coupler 12. A fulcrum B of a rocker 15 is pivoted with a pin 13 to the bracket 13'; the upper end of the rocker 15 is pivoted with a pin 18 to a chassis 17; and the lower end of the rocker 15 is pivoted with a pin 21 to one end of a support rod 20 whose the other end is pivoted with a pin 23 to a bracket 10' securely fixed to the automotive transmission housing 10. A fulcrum E of a rocker 16 is pivoted with a pin 14 to the bracket 14', and the upper end of the rocker 16 is pivoted with a pin 19 to the chassis 17. Thus the rockers 15 and 16, the coupler 12 and the chassis 17 make up a parallelogram double rocker linkage generally indicated by the reference numeral 22.

The diagram of the parallelogram double rocker linkage 22 and its associated levers; that is, the shift lever 1, the control rod 8 and the support rod 20 is shown in FIG. 4. In FIG. 4, reference characters F and G denote the centers of the knob 2 and the ball fulcrum 7, respectively, and A, B, C, D, E and H denote the axes of the pins 18, 13, 21, 19, 14 and 30, respectively (See also FIG. 1). The rockers 15 and 16 and the shift lever 1 are so dimensioned that the following relations are held:

$$\overline{AB} = \overline{DE},$$

$\overline{AD} = \overline{BE}$, and $\overline{AB} / \overline{AC} = \overline{FG} / \overline{FH}$.

In FIG. 3 there is shown the construction of the pin joint typically represented by the pin 30 joining between the lower end of the shift lever 1 and the other end of the control rod 8. The pin 30 comprises a bolt 24 fitted with a spacer 25, and sleeves 26 and 26' are fitted over the spacer 25 when the pin 30 is fitted into lateral bolt holes of the shift lever 1 and the legs 8' and 8" of the yoke at the other end of the control rod 8. Thus when assembled, the legs 8' and 8" of the yoke of the control rod 8 are interposed between the radially outwardly extended flanges of the sleeves 26 and 26' and spring washers 27 and 27', and these parts are securely held in position as a nut 28 is tightened on the bolt 24.

As with the conventional shift mechanism the movement of the shift lever 1 is transmitted through the control rod 8, the universal joint 9 and the control shaft 11 to the automotive transmission 10. However assume that the transmission 10 is displaced forward or backward by a distance a with respect to the chassis 7. Then, as shown in FIG. 4, the lower end of the shift lever 1 or the fulcrum point H which is connected to the control rod 8 is caused to shift by the same distance a forward or backward to the point H'. Same is true for the fulcrum point C which is the joint between the support rod 20 and the lower end of the rocker 15 (See FIG. 1). Thus the rockers 15 and 16 of the parallelogram double rocker linkage 22 swing about the fulcrum or pivot points A and D in the clockwise or counterclockwise direction in FIG. 4. As a result the fulcrum point B is displaced to the point B'; the fulcrum point C, to the point C'; and the fulcrum point E, to the point E', and thus the lines AB, BE, DE and DA form a parallelogram as indicated by broken lines. Therefore the center G of the ball fulcrum 7, which is resiliently supported with the resilient members 3 and 3' in the shift lever housing 4 which in turn is securely mounted on the coupler 12, is caused to swing about the intersection J between line extended through the center G in parallel with the line AB and the line extended through the fulcrum point A in parallel with the line BG. As a consequence, the center G is displaced to the point G'. The distance or displacement from the center G to the center G' is given by $$GG' = a \times \frac{\overline{AB}}{\overline{AC}} = a \times \frac{\overline{FG}}{\overline{FH}}$$

Hence the back and forth displacement of the knob 2 is almost negligible, and so is the vertical displacement of the knob 2. This means that even when the automotive transmission 10 is displaced relative to the chassis 7, the center F of the knob 2 of the shift lever 1 remains stationary so that the driver will not have any unpleasant and uneasy feeling. In addition both the control rod 8 and the support rob 20 are displaced simultaneously by the same distance so that sliping out or disengagement of transmission gears due to the inertia may be prevented.

SECOND EMBODIMENT, FIGS. 5-7

Figure 5:
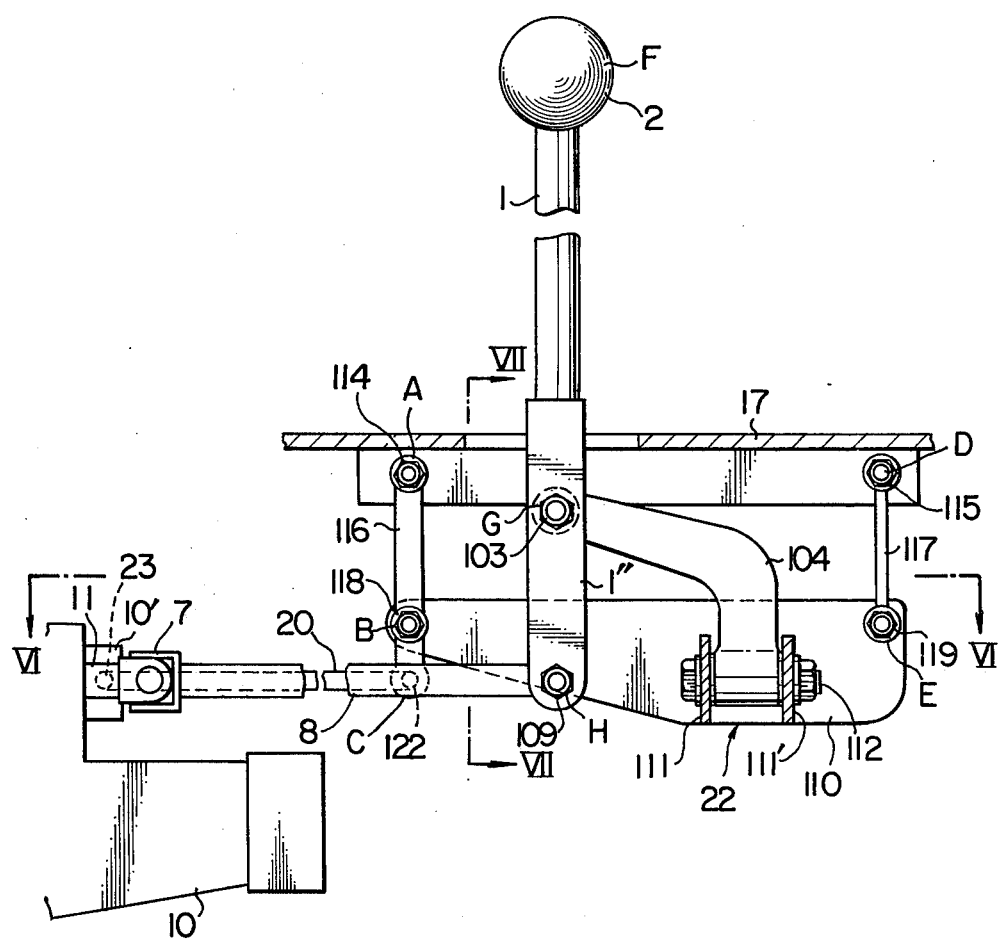
FIG. 5 is a front view, partly in section, of a second embodiment of the present invention.
Figure 6:
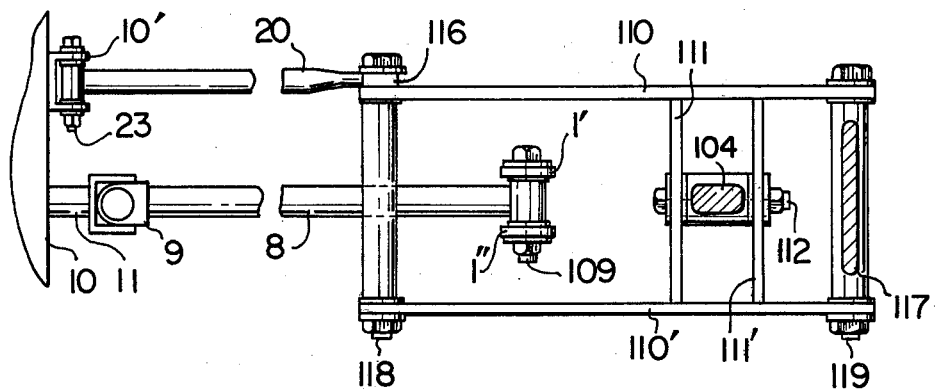
FIG. 6 is a top view thereof.
Figure 7:
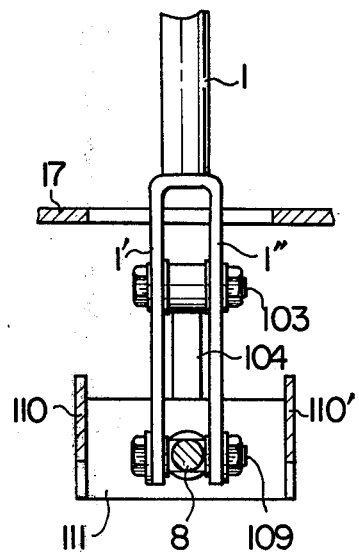
FIG. 7 is a sectional view taken along the line VII—VII of FIG. 5.

The second embodiment will be described below with reference to FIGS. 5-7. The shift lever 1 with the knob 2 has its lower end terminated into a fork or yoke with two prongs or legs 1' and 1" (See FIG. 7) which are pivoted with a pin 109 to one end of the control rod 8 whose the other end is joined through the universal joint 9 to the end of the control shaft 11 extended out of the transmission 10. The shift lever 1 is pivoted between its ends with a pin 103 extending between legs 1' and 1" thereof to the upper end of a roughly L-shaped arm 104 the lower end of which is pivoted with a pin 112 to lateral plates 111 and 111' which are extended between and securely joined to a pair of parallel couplers 110 and 110' (See FIG. 6) in parallel with each other. It should be noted that the extension of the axis of the pivot pin 112 concentrically intersect the axis of the pivot pin 109 at right angle.

A rocker 116 has its upper end pivoted with a pin 114 to the chassis 17, its fulcrum point B pivoted with a pin 118 to the couplers 110 and 110', and its lower end pivoted with a pin 122 to one end of the support rod 20 the other end of which is pivoted with the pin 23 to the bracket 10' which in turn is securely fixed to the transmission 10. In like manner, a rocker 117 has its upper end pivoted with a pin 115 to the chassis 17 and its lower end pivoted with a pin 119 to the couplers 110 and 110'. The distance AB of the rocker 116 is equal to the distance between DE of the rocker 117. Thus the rockers 116 and 117, the couplers 110 and 110' and the chassis 17 make up also a parallelogram double rocker linkage 22. Since the lower end C of the rocker 116 is pivoted to the support rod 20 which is extended in parallel with the control rod 8, the rockers 116 and 117 swing about their pivots or fulcrum points A and D when the transmission 10 is displaced back and forth with respect to the chassis. The shift lever 1 may swing about both the fulcrum point G and the axis of the pin 112 with which the lower end of the arm 104 is pivoted to the lateral plates 111 and 111' and hence to the couplers 110 and 110'.

As in the first embodiment, the reference characters A through E, G and H denote the axes of the pins 114, 118, 122, 115, 119, 103 and 109, respectively, and the rockers 116 and 117 and the shift lever 1 are so dimensioned that the following relations may be held:

$\overline{AB} = \overline{DE}$, $\overline{AD} = \overline{BE}$, and $\overline{AB} / \overline{AC} = \overline{FG} / \overline{FH}$.

All of the pin joints of the second embodiment are also similar in construction to that shown in FIG. 3.

In the second embodiment, the select operation of transmission gears is effected by handling the knob 2 to turn the shift lever 1 about the pivot pin 112 and the shift operation of transmission gears is effected by turning the shift lever 1 about the pivot pin 103. As compared with the first embodiment in which the shift lever 1 pivots about the ball fulcrum 7, the second embodiment ensures more smooth select operation by the shift lever 1, since during the select operation the shift lever 1 pivots about the axis 112 alined with the axis of the control rod 8 so that the control rod 8 may be subjected to only the turning torque but not to an undesirable bending force. Furthermore it is necessary to pivot the shift lever 1 only through a small angle to attain the select operation.

When the transmission 10 is displaced by the distance a with respect to the chassis 7, the lower end H of the shift lever 1 which is coupled through the control rod 8 to the transmission 10 is also displaced by the same distance a as shown in FIG. 4. As a result, the parallelogram double rocker linkage 22 assumes the position indicated by the broken lines in FIG. 4, and the fulcrum point G or the axis of the pivot pin 103 connecting the shift lever 1 to the arm 104 is displaced to the point G' as in the first embodiment. The displacement from the point G to the point G' is also given by $$GG' = a \times \frac{\overline{AB}}{\overline{AC}} = a \times \frac{\overline{FG}}{\overline{FH}}$$

Thus, as with the first embodiment, the back and forth displacement of the knob 2 is negligible.

In summary, according to the present invention even when the engine with the transmission, which is resiliently mounted on the chassis, is displaced relative to the chassis due to the acceleration, deceleration and vibration of the engine, the knob of the shift lever almost remains stationary so that the problems encountered in the prior art shift mechanisms may be substantially overcome. Furthermore the shift mechanism in accordance with the present invention is very simple in construction and inexpensive to manufacture.

What is claimed is:

1. A shift mechanism for an automotive transmission comprising:
    (a) a shift lever having a knob fixed at the upper end thereof,
    (b) a parallelogram double rocker linkage comprising a pair of parallel rockers each having its upper end pivoted to a chassis, and a coupler having its both ends pivoted to said pair of rockers in such a way that the line connecting the pivoted points of said coupler may be in parallel with the line connecting between the upper pivotal points of said pair of rockers,
    (c) means mounted on said parallelogram double rocker linkage for pivotably supporting said shift lever,
    (d) a control rod having its one end pivoted to the lower end of said shift lever and its other end pivoted to a control shaft extended from said automotive transmission for transmitting the movement of said shift lever to said control shaft, and
    (e) a support rod which is extended substantially in parallel with said control rod and which has its one end pivoted to the lower end below said pivotal point to said coupler of one of said parallel rockers and its other end pivoted to the housing of said automotive transmission.

2. A shift mechanism for automotive transmission as defined in claim 1 wherein
    said means for pivotably supporting said shift lever comprises
    a ball or spherical portion securely provided on said shift lever, and
    a socket mounted on said coupler and formed with a spherical surface adapted for snugly receiving therein said ball or spherical portion of said shift lever.

3. A shift mechanism for an automotive transmission as defined in claim 2 wherein
    the ratio of the distance between the upper pivotal point of said
    one rocker and the pivotal point to said coupler to the distance between the upper pivotal point and the lower pivotal point joined to said support rod is equal to the ratio of the distance between the center of said knob of said shift lever and the center of said ball or spherical portion thereof to the distance from said center of said knob of said shift lever to the lower pivotal point joined to said control rod.

4. A shift mechanism for an automotive transmission as defined in claim 1 wherein
    said means for pivotably supporting said shift lever comprises:
    an arm the lower end of which is pivoted to said coupler with a pivot pin the axis of which is alined with the axis of said control rod, and
    a pivot pin with which said shift lever is pivoted to the upper end of said arm and the axis of which is perpendicular to said axis of said pivot pin pivoting the lower end of said arm to said coupler.

5. A shift mechanism for an automotive transmission as defined in claim 4 wherein
    the ratio of the distance between the upper pivotal point of said one rocker and the pivotal point to said coupler to the distance between said upper pivotal point and the lower pivotal point joined to said support rod is equal to the ratio of the distance from the center of said knob of said shift lever to the pivotal point joined to said upper end of said arm to the distance from the center of said knob of said shift lever to the lower pivotal point joined to said control rod.

* * * * *